(12) United States Patent
Porsch et al.

(10) Patent No.: US 12,522,263 B2
(45) Date of Patent: Jan. 13, 2026

(54) CONTROLLING DATA TRANSMISSION BETWEEN A RAIL-BOUND VEHICLE AND A LAND-BASED DEVICE BY MEANS OF THE LAND-BASED DEVICE

(71) Applicant: Siemens Mobility GmbH, Munich (DE)

(72) Inventors: Roland Porsch, Speichersdorf (DE); Rafael Peter Revesz, Zsambek (HU)

(73) Assignee: Siemens Mobility GmbH, Munich (DE)

( * ) Notice: Subject to any disclaimer, the term of this patent is extended or adjusted under 35 U.S.C. 154(b) by 115 days.

(21) Appl. No.: 18/555,573

(22) PCT Filed: Apr. 7, 2022

(86) PCT No.: PCT/EP2022/059336
§ 371 (c)(1),
(2) Date: Oct. 16, 2023

(87) PCT Pub. No.: WO2022/218827
PCT Pub. Date: Oct. 20, 2022

(65) Prior Publication Data
US 2024/0190484 A1  Jun. 13, 2024

(30) Foreign Application Priority Data
Apr. 14, 2021 (DE) .................. 10 2021 203 694.5

(51) Int. Cl.
*B61L 15/00* (2006.01)
(52) U.S. Cl.
CPC .......................... *B61L 15/0027* (2013.01)

(58) Field of Classification Search
CPC ............ B61L 15/0027; B61L 15/0063; B61L 2205/04; B61L 27/57
See application file for complete search history.

(56) References Cited

U.S. PATENT DOCUMENTS

| 9,210,645 B2* | 12/2015 | Gleixner ................. H04L 45/04 |
| 10,645,708 B2 | 5/2020 | Klemp et al. |
| 10,706,402 B2* | 7/2020 | Aabye .................. G06Q 20/326 |

(Continued)

FOREIGN PATENT DOCUMENTS

| DE | 10064955 A1 | 7/2002 |
| DE | 102008016868 A1 | 12/2008 |

(Continued)

*Primary Examiner* — Joseph J Dallo
(74) *Attorney, Agent, or Firm* — Laurence A. Greenberg; Werner H. Stemer; Ralph E. Locher (57) ABSTRACT

A method and a system for controlling transmission of data between a rail-bound vehicle and a land-based device. A communication characteristic of a mobile communication gateway of a plurality of mobile communication gateways of the rail-bound vehicle is identified, where the mobile communication gateway includes at least one communication channel via which data are transmitted to the land-based device and/or are received by the land-based device. Furthermore, the land-based device selects, on the basis of the identified communication characteristic of the communication gateway, at least one communication gateway of the plurality of communication gateways for an upcoming data transmission.

17 Claims, 3 Drawing Sheets

(56) References Cited

U.S. PATENT DOCUMENTS

| | | | |
|---|---|---|---|
| 2012/0066769 A1* | 3/2012 | Latchem | G06F 21/6263 |
| | | | 726/26 |
| 2013/0007286 A1* | 1/2013 | Mehta | H04W 76/10 |
| | | | 709/227 |
| 2016/0373996 A1 | 12/2016 | Yang et al. | |
| 2017/0255919 A1* | 9/2017 | Aabye | G06Q 40/12 |
| 2018/0132060 A1 | 5/2018 | Dhulipalla et al. | |
| 2020/0139995 A1 | 5/2020 | Loch | |
| 2021/0400767 A1* | 12/2021 | Zubiaur | H04W 88/16 |
| 2022/0361257 A1 | 11/2022 | Porsch | |

FOREIGN PATENT DOCUMENTS

| | | | |
|---|---|---|---|
| DE | 102009060358 A1 | 6/2011 | |
| DE | 102010002740 A1 | 9/2011 | |
| DE | 102013215729 A1 | 10/2014 | |
| DE | 102019208515 A1 | 12/2020 | |
| EP | 2000387 A2 | 12/2008 | |
| WO | WO-03077745 A1 * | 9/2003 | ........... A61B 5/0006 |
| WO | WO 2007048443 A1 | 5/2007 | |
| WO | WO 2007147700 A1 | 12/2007 | |
| WO | WO-2008053120 A1 * | 5/2008 | ........... H04W 8/005 |
| WO | WO-2012163094 A1 * | 12/2012 | ........... H04W 28/08 |
| WO | WO-2019048032 A1 * | 3/2019 | ............ G03B 25/00 |
| WO | WO-2022218827 A1 * | 10/2022 | ......... B61L 15/0027 |
| WO | WO-2023036597 A1 * | 3/2023 | ............. H04W 4/42 |
| WO | WO-2023046424 A1 * | 3/2023 | ......... B61L 15/0027 |

\* cited by examiner

FIG 2

CONTROLLING DATA TRANSMISSION BETWEEN A RAIL-BOUND VEHICLE AND A LAND-BASED DEVICE BY MEANS OF THE LAND-BASED DEVICE

SPECIFICATION

FIELD AND BACKGROUND OF THE INVENTION

The invention relates to a method and a system for controlling transmission of data between a rail-bound vehicle and a land-based device.

In principle, it is known that data is transmitted between a rail-bound vehicle and a land-based device (e.g. a control center). The control center can be located, for example, in a train station or in a signal box. Different types of transmission (e.g. radio, light, etc.) are available for data transmission (also called communication) between a vehicle and the land-based device.

WO 2007/147700 describes a method for transmitting data, in particular between a railway vehicle and a control center.

DE 10 2019 208 515 A1 describes a method for establishing a wireless data connection between a vehicle and an external unit. In the method, a test is performed by the vehicle to determine whether at least one condition of one or more predetermined conditions for establishing a connection is met. It is further proposed that, depending on the result of the test, a wireless data connection is established by the vehicle with the external unit for data transmission.

SUMMARY OF THE INVENTION

Against this background, it is the object of the invention to provide an improved method for controlling the transmission of data between a rail-bound vehicle and a land-based device.

This object is achieved by a method for controlling transmission of data between a rail-bound vehicle and a land-based device. In the method, a communication characteristic of a mobile communication gateway of a plurality of mobile communication gateways of the rail-bound vehicle is determined. The mobile communication gateway has at least one communication channel via which data is sent to the land-based device and/or is received from the land-based device.

The land-based device selects, on the basis of the determined communication characteristic of the mobile communication gateway, at least one mobile communication gateway of the plurality of mobile communication gateways for an upcoming data transmission.

The invention is based on the knowledge of the general growth in data volumes intended for transmission from a land-based device to a rail-bound vehicle (and vice versa). At the same time, the conditions of the rail-bound vehicle and the route traveled by the vehicle permit data transmission only under certain conditions, with different data transmission rates and/or quality.

In addition, the invention has recognized that due to the importance and criticality of data transmission, multiple communication gateways are often installed on a rail-bound vehicle to achieve the desired availability. When transmitting data from the rail-bound vehicle to the land-based device, for example when pushing a file from a subsystem of the rail-bound vehicle to the landside, it is necessary to select one of the plurality of mobile communication gateways for data transmission. An algorithm can be used for the selection. When transmitting data from the landside to the rail-bound vehicle (for example, transmitting a file from the landside to the trainside), it is also desirable to select one of the plurality of communication gateways for the data transmission.

The invention is further based on the recognition that solutions to date often employ a random strategy in selecting the mobile communication gateway for an upcoming data transmission.

In order to meet the requirements described above, the solution according to the invention teaches that the selection is carried out by means of the land-based device. The selection takes into account a communication characteristic of the communication gateway, preferably of all communication gateways installed on the vehicle.

The mobile communication gateway is to be understood as "mobile" in the sense that it is permanently installed on the rail-bound vehicle and moves according to the movement of the vehicle along the route. The communication gateway is therefore mobile relative to the landside, but fixed in relation to the rail-bound vehicle. For example, the mobile communication gateways are each designed as a mobile communication gateway. The land-based device is designed, for example, as a ground communication gateway (GCG).

The data transmission is preferably carried out using a network protocol.

The data transmission between the rail-bound vehicle and the land-based device is preferably performed by means of a communication device comprising a sender unit and a receiver unit. In the case of data transmission from the rail-bound vehicle to the land-based device, the sender unit is located on the rail-bound vehicle and the receiver unit is located on the landside. In a reverse data transmission from the land-based device to the rail-bound vehicle, the sender unit is located on the landside and the receiver unit on the rail-bound vehicle. The sender unit and receiver unit of the rail-bound vehicle or the land-based device are in each case formed by a single transmitter-receiver unit.

The rail-bound vehicle is preferably a railway vehicle, for example a multiple unit.

The person skilled in the art understands the phrase "between a rail-bound vehicle and a land-based device" to mean that data can be transmitted both from the vehicle to the landside and from the land-based device to the vehicle. In other words: Both directions of data transmission are covered by the phrase "between a rail-bound vehicle and a land-based device".

The wording according to which "a communication characteristic of a communication gateway of a plurality of communication gateways" is determined is preferably to be understood as meaning that a communication characteristic of a single, several or all mobile communication gateways of the rail-bound vehicle is determined.

The determined communication characteristic of the communication gateway is preferably kept on the land-based device (for example, stored by means of a storage device).

More preferably, selecting a communication gateway is performed by executing a computer program that is executed on the land-based device. The land-based device preferably comprises a computing device, which serves as a selection device, for executing the aforementioned computer program.

The wording according to which a communication gateway of the plurality of communication gateways is selected for an upcoming data transmission is to be understood as selecting via which of the plurality of communication gateways the data is transmitted.

Preferably, the land-based device implements a strategic approach that uses a static configuration and/or dynamic data to determine which mobile communication gateway is selected for the upcoming data transmission.

According to a preferred embodiment of the method according to the invention, the respective communication gateway has a plurality of communication channels via which data is sent to the land-based device and/or received from the land-based device.

The communication channels include, for example, a wireless radio connection, such as WLAN or mobile radio.

The communication characteristic of the communication gateway preferably comprises a communication characteristic of at least one of the plurality of communication channels. Preferably, the communication characteristic is determined and at least one communication channel of the plurality of communication channels for an upcoming data transmission is selected by means of the land-based device on the basis of the determined communication characteristic of the communication channel.

In a preferred embodiment of the method according to the invention, the communication characteristic comprises an activity status of the communication gateway, wherein the communication gateway is classified as active when the communication gateway is powered on and reachable by the land-based device.

To avoid wasting computing and communication capacity, the communication gateways are preferably not run as a standby system. Instead, they are used in an active/active configuration where multiple communication gateways of the rail-bound vehicle are active and can communicate with the land-based device.

Preferably, the communication gateway is classified as active when it is powered on, booted up, and reachable by the land-based device. For example, the reachability of the mobile communication gateway is detected based on a connection status between the land-based device and the mobile communication gateway. In addition, the mobile communication gateway (for example, each communication gateway of the plurality of communication gateways) sends status information to the land-based device indicating if the mobile communication gateway is powered on, booted up, and capable of communicating. Based on this information, the land-based device can determine the number and status of available mobile communication gateways of a particular rail-bound vehicle and select a particular mobile communication gateway for an upcoming data transmission.

Static strategies, which are predefined (set) on the land-based device, are described below. In addition, dynamic strategies can be implemented and combined with the static strategies. These dynamic strategies are described below.

According to a preferred development, the mobile communication gateway is selected based on a list of active mobile communication gateways. For an upcoming data transmission, the mobile communication gateway is selected which follows the mobile communication gateway used for a past or current data transmission in an order specified by the list.

The list specifies a sequence that enables the land-based device to select the mobile communication gateway for an upcoming data transmission. In particular, the process carried out according to the list is a round-robin process.

According to another preferred development, the selection of the mobile communication gateway from a plurality of active mobile communication gateways is performed randomly.

Preferably, the random selection is based on numbers generated by a random number generator. The random number generator preferably generates evenly distributed random numbers. An example of a random number generator is the Mersenne Twister.

According to another preferred development, a predetermined active first mobile communication gateway is selected for a data transmission and a predetermined second mobile communication gateway is selected for an upcoming data transmission when the first mobile communication gateway is inactive.

Preferably, the first mobile communication gateway is statically predefined, in particular such that the same mobile communication gateway is always selected for a data transmission and the same second mobile communication gateway is always selected for an upcoming data transmission when the first mobile communication gateway is inactive. More preferably, the same third mobile communication gateway is always selected for an upcoming data transmission when the first and second mobile communication gateways are inactive.

Dynamic strategies based on information communicated by the mobile communication gateway to the land-based device and/or collected by means of the land-based device are described below.

According to a preferred development, the communication characteristic is identified based on data sent from the mobile communication gateway to the land-based device. Preferably, the data is sent to the land-based device during the same operation in which the communication characteristic of the rail-bound vehicle is also determined.

For the purposes of this development, operation means, for example, operation of the rail-bound vehicle and/or operation of the mobile communication gateway (runtime).

According to another preferred development, the number of applications running on the respective mobile communication gateway is determined. Quantity information representing the number of these is sent to the land-based device. The mobile communication gateway of the plurality of mobile communication gateways running the smallest number of applications is selected for the upcoming data transmission.

The development is particularly expedient for a configuration where at least two of the (distributed) application components installed on the mobile communication gateway are not used in an active/active configuration. In a configuration of this type, the mobile communication gateway sends quantity information representing the number of applications running on the mobile communication gateway to the land-based device. The land-based device selects the mobile communication gateway running the smallest number of applications for the upcoming data transmission.

In another preferred development, a processor utilization of a processor of the respective mobile communication gateway is determined. The mobile communication gateway with the lowest processor utilization is selected for the upcoming data transmission.

For example, each communication gateway sends load information representing the current processor utilization of a processor of the communication gateway to the land-based device at regular time intervals (i.e. cyclically). The land-based device selects one of the mobile communication gateways for the upcoming data transmission based on the received load information from the different mobile communication gateways.

In another preferred development, a communication load of the respective mobile communication gateway is determined. The mobile communication gateway with the lowest communication load is selected for the upcoming data transmission.

According to another preferred development, the location of the rail-bound vehicle is determined. The mobile communication gateway is selected depending on the location of the rail-bound vehicle for the upcoming data transmission.

The location of the rail-bound vehicle is, for example, a stop, a depot, a predetermined location on the route, a territory, such as a state territory, a cellular area of a cellular operator, etc.

The location is preferably determined by means of a location detection device of the rail-bound vehicle on the basis of a location signal. The location signal includes, for example, a GNSS signal or a rotation signal from an odometer pulse generator.

Location information, which represents the location of the rail-bound vehicle, is sent during operation from one of the mobile communication gateways to the land-based device. Based on this location information, the land-based device can select one of the communication gateways for the upcoming data transmission.

This development is particularly expedient for the use of modems with SIM cards for communication between the mobile communication gateway and the land-based device. For example, according to the development, the modem of one of the communication gateways that generates the lowest communication costs (e.g. in the home network) is used, and/or the SIM card of providers for which the best data rates are known in an area where the vehicle is currently operating is used. In this way, roaming costs are avoided as far as possible, or at least reduced.

For this strategy, one of the mobile communication gateways communicates the location information to the land-based device. Knowledge of communication costs and data rate (bandwidth) in a given area is obtained, for example, based on a map that assigns a network parameter, such as signal strength and/or signal quality, and/or communication costs to a location. A map of this kind is described, for example, in US 2018/0132060 A1, DE 10 2009 060 358 A1, DE 100 64 955 A1 and DE 10 2010 002 740 A1.

Based on the location and use of the map, the land-based device selects one of the mobile communication gateways for the upcoming data transmission.

According to another preferred development, a data volume consumed by the mobile communication gateway over a specified length of time is determined. The mobile communication gateway with the lowest data volume is selected for the upcoming data transmission.

Preferably, a data volume is determined that the mobile communication gateway has consumed within a specified length of time for a past data transmission.

This development is particularly expedient for a configuration that uses SIM cards with a specified data volume. With these SIM cards, communication costs increase significantly once the prepaid data volume is exhausted and there is further data to be transmitted.

For example, one of the mobile communication gateways sends volume information, representing the data volume consumed within the specified length of time, to the land-based device for each SIM card installed on the rail-bound vehicle. The land-based device selects the modem with the lowest consumed data volume for the upcoming data transmission.

This development can be combined with other developments described above: For example, the location of the rail-bound vehicle is determined to avoid using the SIM card with the lowest data volume which generates the highest roaming costs.

According to another preferred development, starting from the land-based device, a ping request is sent to the plurality of mobile communication gateways. A packet round-trip time of the respective ping request is determined for a respective mobile communication gateway. For the upcoming data transmission, the mobile communication gateway is selected for which the shortest packet round-trip time was determined.

For example, ping requests are sent to all active mobile communication gateways at regular time intervals (cyclically). The land-based device waits for the respective response to the respective ping request and calculates the packet round-trip time. For the upcoming data transmission, the mobile communication gateway with the shortest round-trip time is configured.

The embodiments and developments described above can be combined and weighted to achieve a further preferred development. For example, weighting can be performed in such a way that a communication characteristic, such as processor utilization, is given a first weighting and a communication characteristic, such as packet round-trip time, is given a second weighting in the selection decision.

The goal of the described embodiments, developments and combinations is to select one of the several communication gateways which is optimal for an upcoming data transmission in that a high transmission rate (bandwidth) and low costs for the communication as well as an optimal use of the communication gateways, or even the communication gateways with the lowest resource usage, is achieved.

The invention further relates to a computer program comprising commands which, when the program is executed by a computing unit of a rail-bound vehicle and/or a land-based device, cause the computing unit to perform the method of the type described above.

The invention further relates to a computer-readable storage medium comprising commands which, when executed by a computing unit of a rail-bound vehicle and/or a land-based device, cause it to perform the method of the type described above.

The invention further relates to a land-based device for controlling transmission of data between a rail-bound vehicle and a land-based device. The land-based device comprises a determination device configured to identify a communication characteristic of a mobile communication gateway of a plurality of mobile communication gateways of the rail-bound vehicle, wherein the mobile communication gateway identifies at least one communication channel via which data is sent to the land-based device and/or received from the land-based device. The land-based device further comprises a selection device configured to select at least one mobile communication gateway of the plurality of mobile communication gateways for an upcoming data transmission based on the identified communication characteristics of the mobile communication gateway.

The invention further relates to a system for controlling transmission of data between a rail-bound vehicle and a land-based device. The system comprises a land-based device having a determination device configured to identify a communication characteristic of a mobile communication gateway of a plurality of mobile communication gateways of the rail-bound vehicle, wherein the mobile communication gateway identifies at least one communication channel via which data is transmitted to the land-based device and/or received from the land-based device. The system further comprises a selection device configured to select a mobile communication gateway of the plurality of mobile communication gateways for an upcoming data transmission based on the determined communication characteristic of the mobile communication gateway.

For advantages, embodiments and embodiment details of the land-based device according to the invention and the system, computer program and machine-readable storage medium according to the invention, reference can be made to the above description for the corresponding method features.

BRIEF DESCRIPTION OF THE FIGURES

Exemplary embodiments of the invention are explained with reference to the drawings. These show as follows.

DETAILED DESCRIPTION OF THE INVENTION

Figure 1:
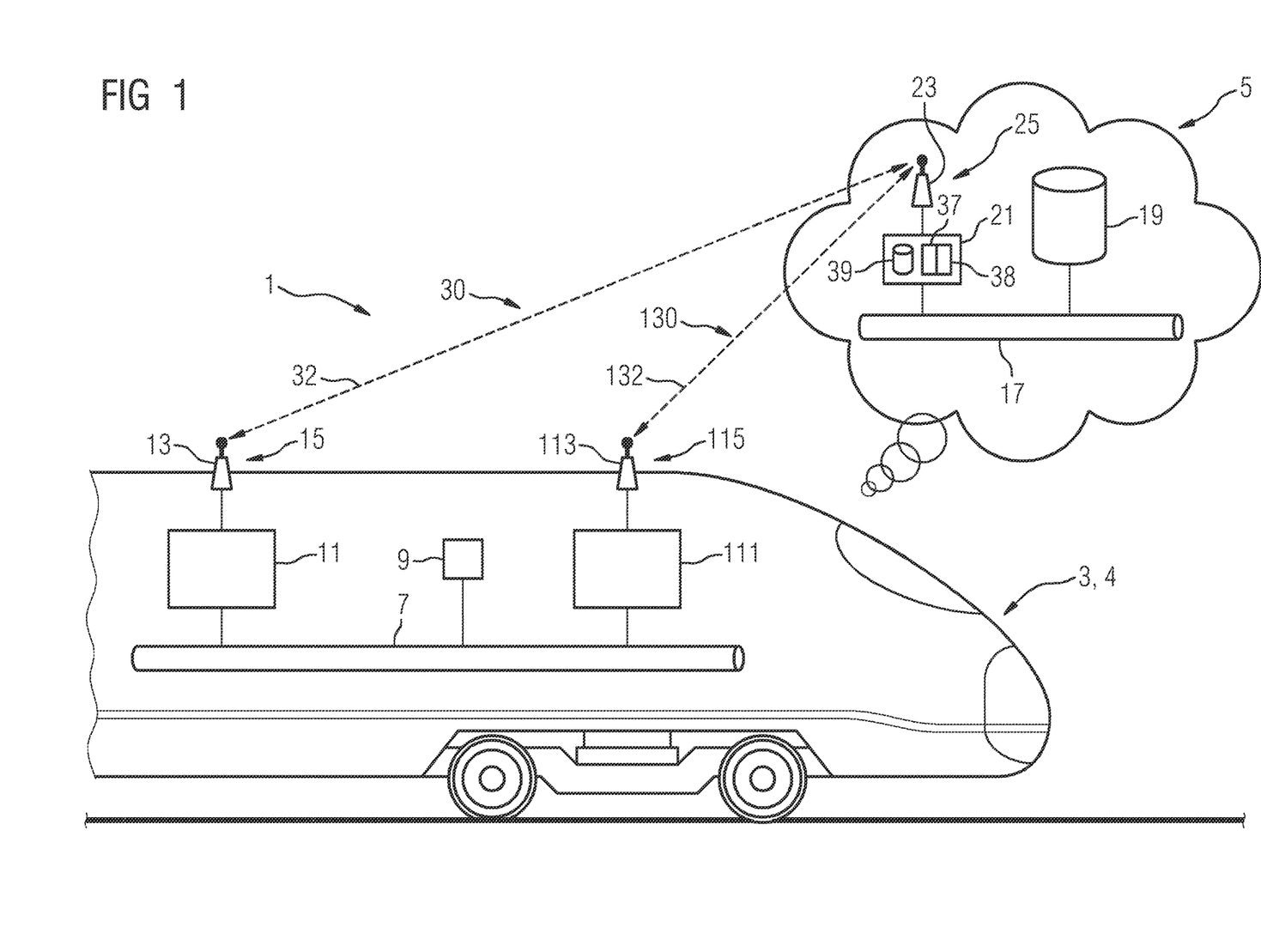
FIG. 1 a schematic view of the structure of a system according to the invention with a rail-bound vehicle and a land-based device, FIG. 2 a schematic view of the sequence of several exemplary embodiments for a static strategy according to a method according to the invention, and FIG. 3 a schematic view of the sequence of several exemplary embodiments for a dynamic strategy according to the method according to the invention.

FIG. 1 is a schematic view of a system 1 with a rail-bound vehicle 3 and a land-based device 5.

The rail-bound vehicle 3 is a railway vehicle 4. The land-based device 5 is part of a control center.

The rail-bound vehicle 3 has a communication network 7, which is configured as an Ethernet network. A terminal device 9, for example, is connected using data technology to the communication network 7. In addition, a plurality of communication gateways 11 and 111 are connected to the communication network 7. The communication gateway 11 or 111 is connected to a wireless communication interface 13 or 113. The communication gateway 11 or 111, together with the wireless communication interface 13 or 113, forms a communication device 15 or 115, which is configured to send data to the land-based device 5 and receive data from the land-based device 5.

According to the exemplary embodiment shown in FIG. 1, two mobile communication gateways 11 and 111 are present on the vehicle 3. An exemplary embodiment, not described, with more than two mobile communication gateways is covered by the inventive concept. In other words: The exemplary embodiment described here can be usefully applied to a configuration with more than two mobile communication gateways.

The mobile communication gateways 11 and 111, for example, are referred to as MCGs.

The land-based device 5 has a communication network 17, which is an Ethernet network. A server 19, for example, is connected using data technology to the communication network 17. In addition, a ground communication gateway 21 is connected to the communication network 17, which is linked to a wireless communication interface 23. The ground communication gateway 21, together with the wireless communication interface 23, forms a communication device 25 that is configured to send data to the rail-bound vehicle 3 and receive data from the rail-bound vehicle 3.

The communication devices 15 or 115 and 25 together form a communication link 30 or 130 for transmitting data between the rail-bound vehicle 3 and the land-based device 5, i.e. from the rail-bound vehicle 3 to the land-based device 5 and from the land-based device 5 to the rail-bound vehicle 3.

The respective communication gateway 11 or 111 has a plurality of communication channels via which data is sent to the land-based device 5 and received from the land-based device 5. FIG. 1 shows an example of a radio channel 32 or 132 as one of the communication channels of the respective communication gateway 11 or 111. Other radio channels not shown are, for example, a mobile radio channel or a WLAN channel.

Exemplary embodiments of the method according to the invention are described with reference to FIGS. 2 and 3. Static strategies for selecting one of the mobile communication gateways 11 or 111 for an upcoming data transmission are described below with reference to FIG. 2. Dynamic strategies for selecting one of the mobile communication gateways 11 or 111 for an upcoming data transmission are described below with reference to FIG. 3.

Figure 2:
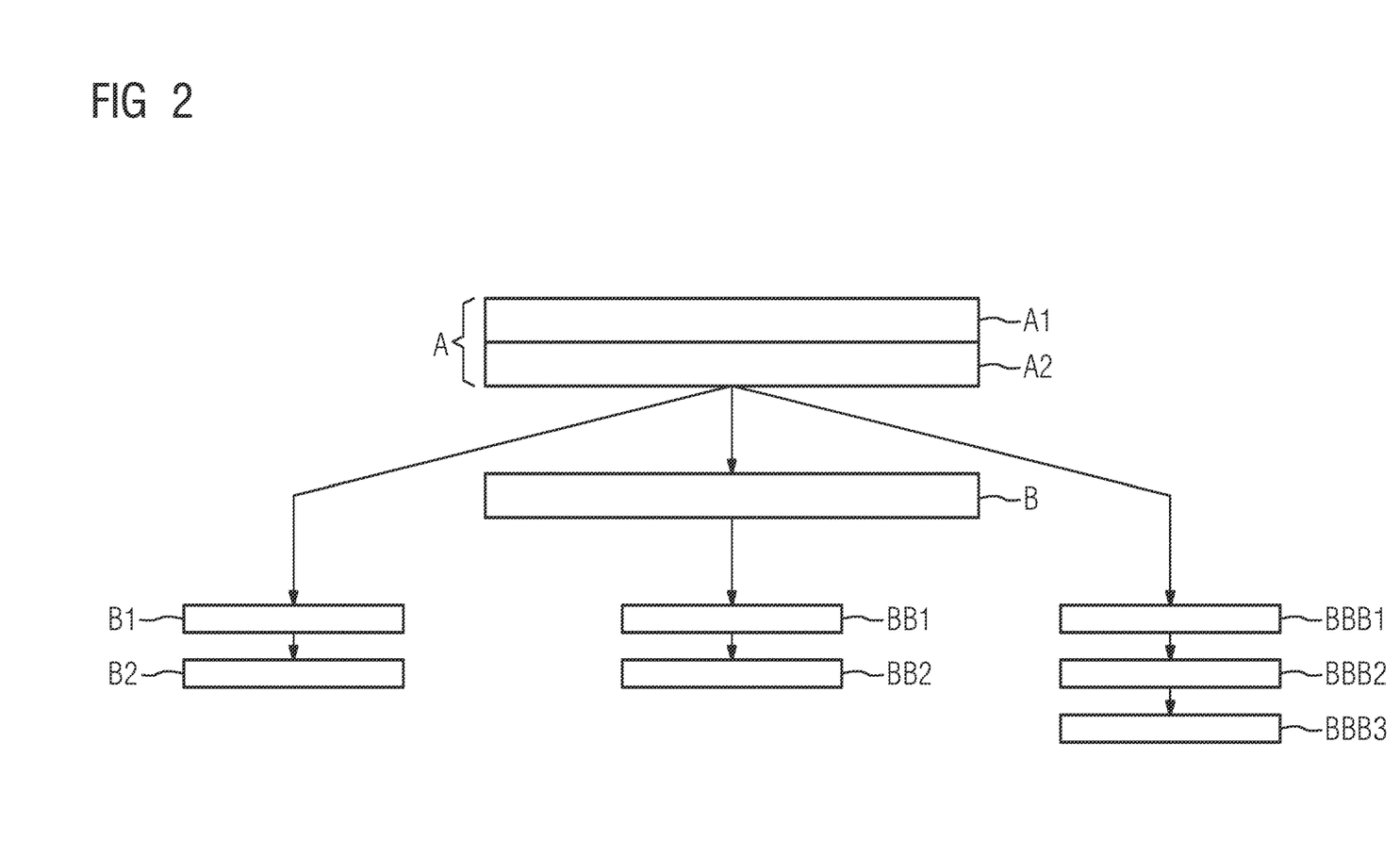

FIG. 2 is a schematic representation of the sequence of the method according to the invention, in which the static strategy is preset on the land-based device 5. The presets are stored, for example, on a storage device 39 of the ground communication gateway 21.

In a method step A, an activity status of the mobile communication gateways 11 and 111 is identified as a communication characteristic by means of the land-based device 5, in particular by means of a determination device 37 of the ground communication gateway 21. The mobile communication gateway 11 or 111 is classified as active if it is powered on, booted up and accessible through the ground communication gateway 21. For example, the reachability of the mobile communication gateway 11 or 111 is detected based on a connection status of the communication link 30 or 130 between the land-based device 5 and the mobile communication gateway 11 or 111. For example, in a method step A1, each communication gateway 11 and 111 sends status information to the land-based device 5. The status information indicates if the mobile communication gateway 11 or 111 is powered on, booted up and ready for communication.

Based on this information, in a method step A2 the land-based device 5 determines the number and status of available mobile communication gateways of a particular rail-bound vehicle 3.

Based on this information, the land-based device 5, in particular a selection device 38 of the ground communication gateway 21, selects in a method step B a specific mobile communication gateway 11 or 111 for an upcoming data transmission:

According to a first exemplary embodiment for a static strategy, in a method step B1, a list is retrieved from the storage device 39 of the ground communication gateway 21. The list specifies the order in which mobile communication gateways are intended for data transmission. In a method step B2, the selection device 38 selects one of the mobile communication gateways 11 or 111 for an upcoming data transmission based on knowledge about the active mobile communication gateways and about the list. In particular, the mobile communication gateway is selected which follows the mobile communication gateway that was used for a past data transmission or is used for the current data transmission in the order specified by the list.

According to a second exemplary embodiment for a static strategy, the mobile communication gateway 11 or 111 is randomly selected for the upcoming data transmission. In a method step BB1, a sequence of evenly distributed random numbers is generated using a random number generator, such as the Mersenne Twister. For example, evenly distributed random numbers between 0 and 1 are generated. The sequence of random numbers specifies an order for the selection of the mobile communication gateways 11 and 111. For example, for an upcoming data transmission, the mobile communication gateway 11 is to be selected if the next random number of the sequence is in the interval (0, 0.5), and the mobile communication gateway 111 is to be selected if the next random number of the sequence is in the interval (0.5, 1). In a method step BB2, the selection device 37 selects one of the mobile communication gateways 11 and 111 for an upcoming data transmission based on knowledge about the active mobile communication gateways and about the sequence of random numbers.

According to a third exemplary embodiment for a static strategy, a specified mobile communication gateway 11 or 111 is selected and maintained for the upcoming data transmission. In a method step BBB1, preset information representing the preset mobile communication gateway is retrieved and the mobile communication gateway 11 or 111 for the upcoming data transmission is selected in a method step BBB2. In the following, the same first communication gateway 11 or 111 is always used for an upcoming data transmission. If this communication gateway is inactive, a further second communication gateway for the upcoming data transmission is selected in a method step BBB3 based on the preset information. This further second communication gateway is used until it is inactive, and then another third predefined active communication gateway is selected.

Figure 3:
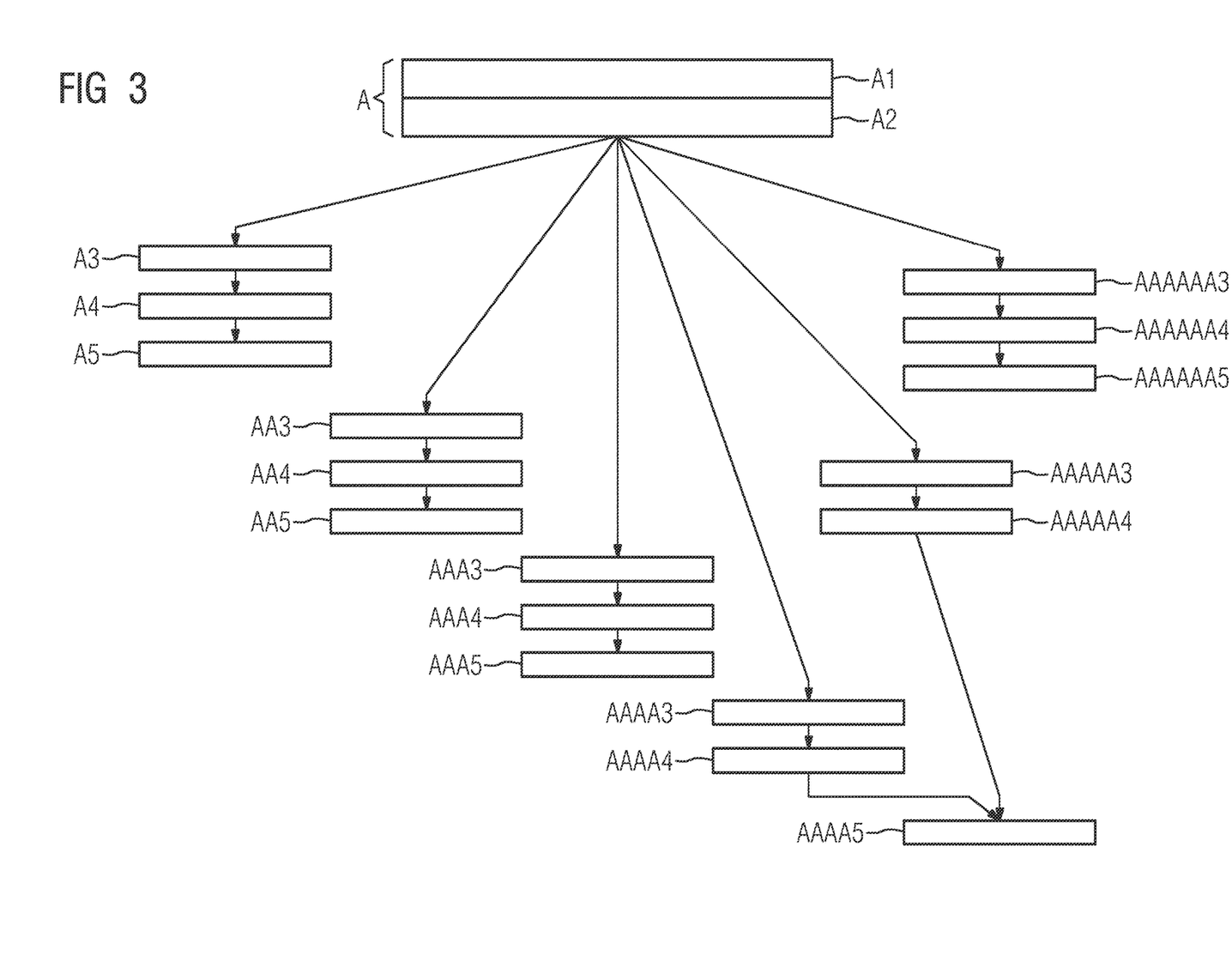

FIG. 3 is a schematic representation of the sequence of the method according to the invention, in which the dynamic strategy is used based on dynamic data.

In a method step A, an activity status of the mobile communication gateways 11 and 111 is identified as a communication characteristic by means of the determination device 37 (as described above in relation to FIG. 2). For example, in a method step A1, each communication gateway 11 and 111 sends status information to the land-based device 5. The status information indicates if the mobile communication gateway 11 or 111 is powered on, booted up and ready for communication.

Based on this information, in a method step A2 the land-based device 5 determines the number and status of available mobile communication gateways of a particular rail-bound vehicle 3.

In the dynamic strategy, further communication characteristics are identified and collected on the land-based device 5, in particular on the storage device 39 of the ground communication gateway 21.

According to a first exemplary embodiment of the dynamic strategy, in a method step A3, the number of applications running on the respective mobile communication gateway 11 and 111 is determined. The mobile communication gateway 11 or 111 sends quantity information representing the number of applications running, to the land-based device in a method step A4. For the upcoming data transmission, in a method step A5 one of the mobile communication gateways 11 and 111 is selected on which the smallest number of applications is running.

According to a second exemplary embodiment of the dynamic strategy, a processor utilization of a processor of the respective communication gateway 11 and 111 is determined in a method step AA3. In a method step AA4, the mobile communication gateway 11 or 111 sends load information representing the current processor utilization to the land-based device 5. In a method step AA5, the selection device 38 of the ground communication gateway 21 selects the mobile communication gateway 11 or 111 with the lowest processor utilization for the upcoming data transmission.

According to a third exemplary embodiment of the dynamic strategy, a communication load of the respective communication gateway 11 and 111 is determined in a method step AAA3. In a method step AAA4, the mobile communication gateway 11 or 111 sends utilization information representing the current communication load to the land-based device 5. In a method step AAA5, the selection device 38 of the ground communication gateway 21 selects the mobile communication gateway 11 or 111 with the lowest communication load for the upcoming data transmission.

According to a fourth exemplary embodiment of the dynamic strategy, the location of the rail-bound vehicle 3 is determined in a method step AAAA3. The location of the rail-bound vehicle 3 indicates, for example, in which cellular area of a cellular operator the vehicle 3 is located. The location is determined by means of a locating device of the rail-bound vehicle on the basis of a locating signal. The locating signal includes a GNSS signal.

Location information representing the location of the rail-bound vehicle 3 is sent to the land-based device 5 during operation starting from one of the mobile communication gateways 11 or 111. Based on this location information, the ground communication gateway 21 selects one of the communication gateways 11 or 111 for the upcoming data transmission in a method step AAAA4. For example, the communication gateway 11 or 111 that generates the lowest communication costs is selected because the vehicle 3 is located in the home network of the selected communication gateway (and no roaming costs are incurred).

Knowledge of the communication costs and the data rate (bandwidth) in a given area is obtained, for example, based on a map that assigns a network parameter, such as signal strength and/or signal quality, and/or communication costs to a determined location.

According to a fifth exemplary embodiment of the dynamic strategy, in a method step AAAAA3 a data volume is determined which the communication gateway 11 or 111 has consumed within a specified length of time, in particular for a past data transmission. The communication gateways 11 and 111 each have one or more modems with a SIM card. Volume information, representing the data volume consumed within the specified length of time, is sent to the land-based device 3 for each SIM card installed on the rail-bound vehicle 3. The ground communication gateway 21 selects in a method step AAAAA4 the modem of the communication gateways 11 or 111 with the lowest consumed data volume for the upcoming data transmission.

This fifth exemplary embodiment is for example combined with the fourth exemplary embodiment: For example, the location of the rail-bound vehicle is determined in order to avoid, in a method step AAAAA5, the use of the SIM card which has consumed the least data volume but which generates the high roaming costs. The two influencing factors can, for example, be weighted in such a way that the communication costs are included in the selection decision with a first weighting and the data volume consumed with a second weighting.

According to a sixth exemplary embodiment, in a method step AAAAAA3, starting from the ground communication gateway 21 of the land-based device 5, a ping request is sent to each of the communication gateways 11 and 111. For example, the ping request is sent to all active mobile communication gateways 11 and 111 at regular time intervals. The ground communication gateway 21 waits for the respective ping request response and calculates a packet round-trip time of the respective ping request in a method step AAAAAA4. For the upcoming data transmission, in a method step AAAAAA5, the communication gateway 11 or 111 is selected for which the shortest packet round-trip time was determined.

The exemplary embodiments described above may be combined to achieve further exemplary embodiments. The combination is made, for example, by different weighting of the influencing factors that go into the selection decision of the ground communication gateway 21. For example, it is conceivable that the method steps described with reference to FIG. 3 are followed by method step B (FIG. 2), so that the dynamic strategy is combined with the static strategy.

Although the invention has been illustrated and described in more detail by the preferred exemplary embodiment, this shall not limit the invention to the disclosed examples and other variations may be deduced from these by the person skilled in the art without extending beyond the scope of protection of the invention.

The invention claimed is:

1. A method for controlling a transmission of data between a rail-bound vehicle and a land-based device, the method comprising:
   determining a communication characteristic of a mobile communication gateway of a plurality of mobile communication gateways of the rail-bound vehicle, the mobile communication gateway including at least one communication channel via which data is transmitted to the land-based device and/or data is received from the land-based device; and
   selecting, by the land-based device, at least one mobile communication gateway of the plurality of mobile communication gateways for an upcoming data transmission on a basis of the communication characteristic of the mobile communication gateway; and
   transmitting data between the rail-bound vehicle and the land-based device using the selected at least one mobile communication gateway.

2. The method according to claim 1, wherein the respective mobile communication gateway has a plurality of communication channels for sending data to the land-based device and for receiving data from the land-based device.

3. The method according to claim 1, wherein the communication characteristic comprises an activity status of the mobile communication gateway, wherein the communication gateway is classified as active when the mobile communication gateway is powered on and is reachable by the land-based device.

4. The method according to claim 3, which comprises:
   selecting the mobile communication gateway based on a list of active mobile communication gateways; and
   for an upcoming data transmission, selecting a mobile communication gateway which follows the mobile communication gateway used for a past or current data transmission in an order specified by the list.

5. The method according to claim 3, which comprises randomly selecting the mobile communication gateway from a plurality of active mobile communication gateways.

6. The method according to claim 3, which comprises selecting a predetermined active first mobile communication gateway for a data transmission and, when the first mobile communication gateway is inactive, selecting a predetermined second mobile communication gateway for an upcoming data transmission.

7. The method according to claim 3, which comprises identifying the communication characteristic based on data sent from the mobile communication gateway to the land-based device.

8. The method according to claim 7, which comprises:
   determining a number of applications that are running on the respective mobile communication gateway;
   transmitting quantity information representing the number of applications to the land-based device; and
   selecting for the upcoming data transmission the mobile communication gateway of the plurality of mobile communication gateways running a smallest number of applications.

9. The method according to claim 7, which comprises:
   determining a processor utilization of a processor of the respective mobile communication gateway; and
   selecting for the upcoming data transmission the mobile communication gateway with a lowest processor utilization.

10. The method according to claim 7, which comprises:
    determining a communication load of the respective mobile communication gateway; and
    selecting for the upcoming data transmission the mobile communication gateway with a lowest communication load.

11. The method according to claim 7, which comprises:
    determining a location of the rail-bound vehicle; and
    selecting the mobile communication gateway depending on the location of the rail-bound vehicle for the upcoming data transmission.

12. The method according to claim 7, which comprises:
    determining a data volume consumed by the mobile communication gateway over a specified length of time; and
    selecting the mobile communication gateway with a lowest data volume for the upcoming data transmission.

13. The method according to claim 7, which comprises:
    transmitting a ping request from the land-based device to the plurality of mobile communication gateways;
    determining a packet round-trip time of the respective ping request for a respective mobile communication gateway; and
    selecting for the upcoming data transmission the mobile communication gateway with a shortest round-trip time.

14. A computer program, comprising commands which, when the program is executed by at least one of a computing unit of a rail-bound vehicle or a land-based device, cause the computing unit to perform the method according to claim 1.

15. A non-transitory computer-readable storage medium comprising commands which, when executed by at least one of a computing unit of a rail-bound vehicle or a land-based device, cause the computing unit to perform the method according to claim 1.

16. A land-based device for controlling a transmission of data between a rail-bound vehicle and the land-based device, the land-based device comprising:

a determination device configured to determine a communication characteristic of a communication gateway of a plurality of communication gateways of the rail-bound vehicle, the communication gateway having at least one communication channel via which data is sent to the land-based device and/or received from the land-based device;

a selection device configured to select at least one communication gateway of the plurality of communication gateways for an upcoming data transmission based on the determined communication characteristic of the communication gateway; and the selected at least one mobile communication gateway configured to transmit data between the rail-bound vehicle and the land-based device.

17. A system for controlling a transmission of data between a rail-bound vehicle and a land-based device, the system comprising:

a land-based device having a determination device configured to determine a communication characteristic of a communication gateway of a plurality of communication gateways of the rail-bound vehicle, the communication gateway having at least one communication channel via which data is sent to the land-based device and/or received from the land-based device;

a selection device of the land-based device configured to select a communication gateway of the plurality of communication gateways for an upcoming data transmission based on the communication characteristic of the communication gateway determined by the determination device; and the selected at least one mobile communication gateway configured to transmit data between the rail-bound vehicle and the land-based device.

* * * * *